April 28, 1925.                     1,535,333
A. W. MORSE
VALVE
Filed March 28, 1923        2 Sheets-Sheet 1
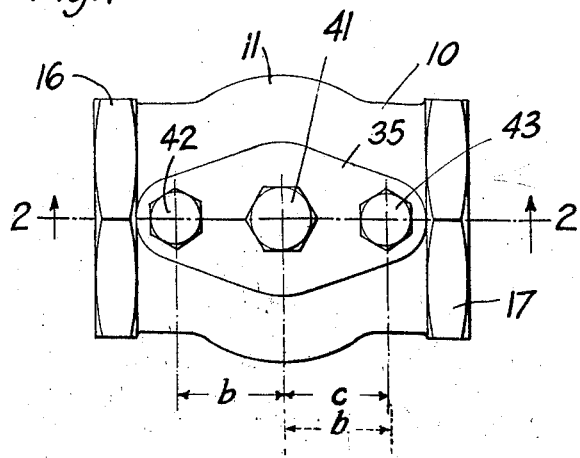
Fig:1
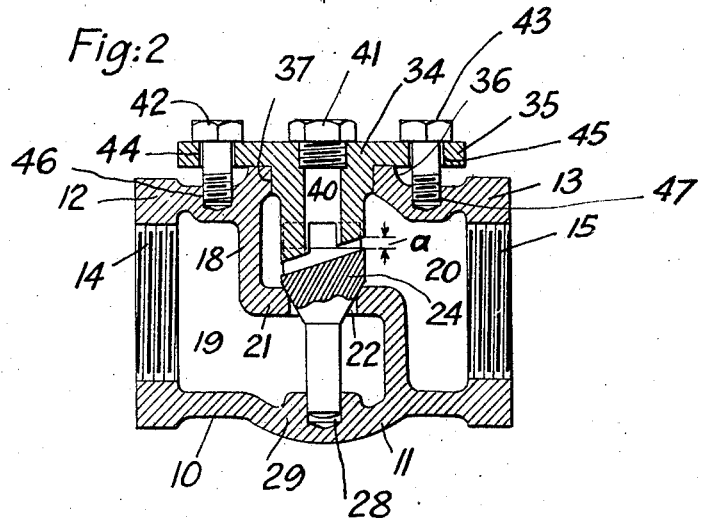
Fig:2
Albert W. Morse
INVENTOR
BY *Walter E. Waleheim*
ATTORNEY April 28, 1925.
A. W. MORSE
VALVE
Filed March 28, 1923    2 Sheets-Sheet 2
1,535,333
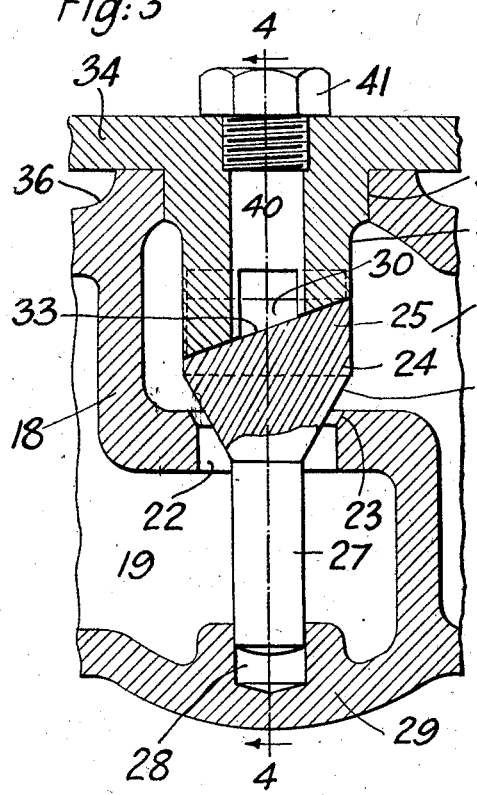
Fig:3
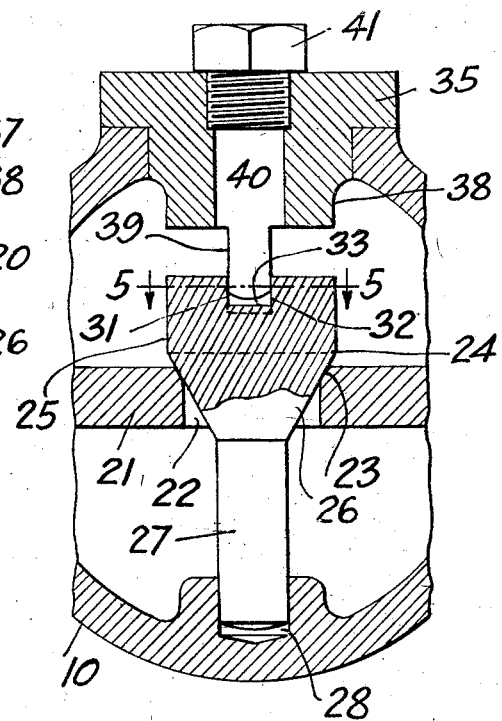
Fig:4
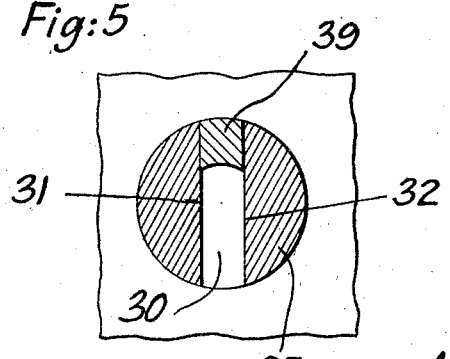
Fig:5
Albert W. Morse
INVENTOR
BY Walter E. Wallheim
ATTORNEY Patented Apr. 28, 1925.

1,535,333

UNITED STATES PATENT OFFICE.

ALBERT W. MORSE, OF LONG ISLAND CITY, NEW YORK.

VALVE.

Application filed March 28, 1923. Serial No. 628,239.

*To all whom it may concern:*

Be it known that I, ALBERT W. MORSE, a citizen of the United States, and a resident of Long Island City, in the county of Queens and State of New York, have invented certain new and useful Improvements in Valves, of which the following is a specification.

This invention relates to new and useful improvements in valves and particularly in valves, the construction of which and process of fitting, are disclosed in Letters Patent No. 1,006,852 issued October 24, 1911 to Edgar A. Kelsey.

It has been found that valves made tight by reversely producing the minute imperfections in the seating surfaces of valves and their seats are of great commercial importance because of their simplicity of designs, reliability of service, and high operating efficiency. By referring to the specification of the above mentioned Letters Patent, it will be seen that such valves are set in position on seats of valve bodies and are provided with means to guide them to this exact position at the end of each operating cycle, and are then pressed into this position so that every projection in the seating face of valves makes a corresponding depression in the valve seats of valve bodies, and vice versa.

The efficiency of these valves depends chiefly upon the construction employed to guide the valves proper to the exact position on seats into which they have previously been pressed. The minute projections must fall into corresponding depressions at each seating. The slightest turning or shifting out of this original impressed position must be avoided. If this is permitted to occur, both projections and depressions become obstacles which prevent seating and cause leakage.

It is the particular purpose of this invention to provide a valve operating on the positive seat principle, as explained above, which can be inserted in standard pipe lines by means of screw threads or flanges.

Another object is to provide a valve in a structure of this character which can be removed and inserted without disturbing the pipe connections.

A further object is to provide an opening through which the valve can be tapped and pressed to its correctly seated position after the valve is assembled, and also permit of retapping and repressing without disassembling.

A still further object is to provide means whereby the valve can be removed, cleaned and replaced into its correctly seated position, and whereby it can not be replaced in any other position.

The invention is illustrated in the accompanying drawing in which is shown a preferred embodiment of the invention in the form of a valve structure, commonly known as a check valve of the horizontal globe type, on a straight pipe line, and in which Fig. 1 is a plan view of the valve;

Fig. 2 is a vertical sectional view along the plane of line 2—2 in Fig. 1;

Fig. 3 is an enlarged fragmentary vertical sectional view showing the valve in an open position;

Fig. 4 is a similar fragmentary cross sectional view along the plane of line 4—4 in Fig. 3, with the valve in closed position; and Fig. 5 is a horizontal cross sectional view along the plane of line 5—5 in Fig. 4.

Like characters of reference denote similar parts throughout the several views and the following specification:

10 is a valve casing of the horizontal globe type, having a central hollow ball shaped portion 11 and tubular extensions 12 and 13, threaded interiorily at 14 and 15 to be screwed into a pipe line, and shaped polygonally at 16 and 17 to provide gripping surfaces for a wrench used to screw the valve into the pipe line. 18 is a diaphragm within the casing dividing the same into an inlet chamber 19 and outlet chamber 20. A central portion 21 of this diaphragm 18 is located in a plane parallel to that of the horizontal axis of the valve casing 10, and is provided with a valve opening 22 having its upper end chamfered to form a valve seat 23.

24 is a valve proper having an upper cylindrical portion 25 and a lower tapering portion 26 adapted to seat against the valve seat 23. 27 is an extension below the portion 26, snugly but slidingly fitted in a bore 28, closed at the outside, at a thickened center portion 29 at the bottom of casing 10. 30 is a slot across the upper face of valve 24, having parallel sides 31 and 32, but its bottom 33 tapering so that one end of the bottom is depressed relatively very deeply, while the other end is brought up even with the upper face of the valve.

34 is a cap having an oval flange 35 contacting with a raised part 36 at the top of the casing 10, and a part 37 guided within the part 36 and in central alignment with valve 24. 38 is a depending portion of the cap 34 projecting into the casing 10 toward the valve 24, and having its lower part flattened at 39 to engage the sides 31 and 32 of the slot 30 in the upper face of valve 24. The lower face of this flattened part 39 is cut off tapering substantially parallel to the bottom of the slot 30 and is at a predetermined small distance $a$ (the lift of the valve) from the bottom of this slot. 40 is a central bore through cap 34 which being somewhat larger in diameter than the flattened part 39 practically divides this part into 2 prongs or lugs of unequal length which engage the slot 30, the longer prong the deeper end of the slot and the shorter prong the shallower end of the same. 41 is a plug closing the open outside end of bore 40. 42 and 43 are screws used to fasten cap 34 to the body by passing through corresponding holes 44 and 45 into tapped holes 46 and 47 at the top of the casing 10. Attention is particularly called to the fact, for reasons apparent later on, that the distance from the center of the cap 34 to the respective centers of screws 42 and 43 is not the same, but that the one marked $b$ is greater than the one marked $c$, in Fig. 1.

The process of assembling the valve structure is, as follows:

The valve 24 is placed in the casing 10. Cap 34 is then placed over it, so that the lower flattened part 39 of the cap engages the slot 30 of the valve 24. Cap 34 is screwed down tightly onto the casing 10 by screws 42 and 43. A rod is then inserted through central bore 40 and the valve 24 is tapped in order to reversely reproduce in the face of tapered portion 26 of the valve 24 and valve seat 23 of casing 10, the minute imperfections. The rod is then withdrawn and the bore 40 closed by plug 41.

In actual operation, fluid or gas, under pressure, is introduced below the valve 24 by way of suitable piping into the inlet chamber 19. The valve 24 is then lifted from its seat, until it strikes with the bottom 33 of slot 30 across its face the lower face of the flattened part 39 of the cap. This uncovers the valve opening 22 and permits the fluid or gas to be discharged into the outlet chamber 20 whence it is forced out into a discharge pipe. While the valve 24 is in a raised position, its lower extension 27 is still in sliding contact with bore 28 at the bottom of the valve casing 10 which in connection with the snug but sliding fit of flattened part 39 of the cap 34 within the slot 30 of the upper face of the valve 24 provide substantial guides so that the valve 24 will unfailingly return to the same position with respect to its seat when again seated.

If it is desired to disassemble the valve structure for cleaning or other purposes, the cap 34 may be easily removed and the valve 24 taken out. In valves of the positive seating type of the kind disclosed in the above mentioned patent to Edgar A. Kelsey and as subsequently improved upon by the applicant in a co-pending application, filed September 6, 1922, Serial No. 586,489, it was never possible to reassemble their parts to again bring their discs and seats in the same relative position, but the valves had again to be made tight by tapping which in some cases where the original imperfections on the seats were too deep, necessitated regrinding operations. In structures as disclosed in this application, the valve and seat may and can only be reassembled in such a manner that the valve will invariably again be brought to seat in the same position in which it was originally fitted. This is obvious by inspection of the construction of the cap 34 and the engagement of its flattened part 39 with the valve 24. Cap 34 can only be screwed onto the casing 10 in one way owing to the difference in distance $b$ and $c$ of its screws, and the flattened part 39 with its prongs of uneven length can be inserted into the slot 30 of valve 24 only in one way, because, unless this flattened part does engage the slot in the valve in the right position, the cap 34 could not be screwed down on account of its long prong engaging the shallow part of the slot 30 which would act as a tell tale, and the valve could be manipulated until the proper registering is effected.

Furthermore, the provision of the plug 40 permits of retapping the valve 24, if it is desired to do so, without disassembling or breaking its pipe connections, thereby prolonging the life of a valve of this type greatly and cutting down the cost of its maintenance.

While I have disclosed in this application a globe valve of the horizontal type embodying my improvements, it is obvious that the same may be used in any other styles of valves, as well. Moreover, while I have shown the lower face of the flattened part 39 of the cap parallel to the bottom of the slot across the upper face of the valve 24, this construction, while very easily to manufacture may be varied and any means which engage the valve in such a way as to prevent it being assembled in any other but one position may be used. So also the guide 27 below the valve 24 may be in form of ribs sliding in the valve opening or the valve may be guided in the body in any other form, or in the cap. It is obvious that various other changes of form, proportion and minor details may be resorted to and the construction modified to suit many other purposes without departing from the principle or sacrificing any of the advantages of the appended claims.

What I claim as new, is:

1. In a valve structure of the type in which a valve is fitted into its seat by pressing one upon the other, a casing having a valve seat, a valve and a cap having lugs and a slot, coacting with each other, for the purpose of reassembling the valve into its seat in only the position in which it was fitted, and a plug through the said cap to permit of refitting the valve into its seat in the same position.

2. In a valve structure of the type in which a valve is fitted into its seat by pressing one upon the other, a casing having a valve seat, a cap detachably secured to the casing, means coacting with the casing and the cap to permit of refastening the cap to the casing in only one position relative to the casing, and a valve, the said cap and valve having lugs and a slot contacting with each other for the purpose of reassembling the valve into its seat in only the position in which it was fitted.

3. In a valve structure of the type in which a valve is fitted into its seat by pressing one upon the other, a casing having a valve seat, a cap detachably secured to the casing, means coacting with the casing and the cap to permit of refastening the cap to the casing in only one position relative to the casing, a valve, the said cap and valve having lugs and a slot contacting with each other for the purpose of reassembling the valve into its seat in only the position in which it was fitted, and a plug through the said cap to permit of refitting the valve into its seat in the same position.

4. In a valve structure of the type in which a valve is fitted into its seat by pressing one upon the other, a casing having a valve seat, a flanged cap detachably secured to the casing and having screw bolts unequally distanced from its center, a valve, the said cap and valve having lugs and a slot contacting with each other for the purpose of reassembling the valve into its seat in only the position in which it was fitted, and a plug through the said cap to permit of refitting the valve into its seat in the same position.

5. In a valve structure of the type in which a valve is fitted into its seat by pressing one upon the other, a casing having a valve seat, a flanged cap detachably secured to the casing and having screw bolts unequally distanced from its center, a valve, the said cap and valve having lugs and a slot contacting with each other for the purpose of reassembling the valve into its seat in only the position in which it was fitted, additional guiding surfaces for the valve, and a plug through the said cap to permit of refitting the valve into its seat in the same position.

In testimony whereof I have hereunto set my hand and seal in presence of two subscribing witnesses.

ALBERT W. MORSE. [L. S.]

Witnesses:
MABEL E. CHURCHILL,
WILLIAM DENT.